(No Model.)

W. L. VAN HORN & M. YOUNT.
DISH CLEANER.

No. 549,756. Patented Nov. 12, 1895.

Witnesses
Jos. C. Stack
H. J. Riley

Inventors
William L. Van Horn
Morton Yount
By their Attorneys,
C. A. Snow & Co.

UNITED STATES PATENT OFFICE.

WILLIAM L. VAN HORN AND MORTON YOUNT, OF NORFOLK, NEBRASKA.

DISH-CLEANER.

SPECIFICATION forming part of Letters Patent No. 549,756, dated November 12, 1895.

Application filed February 4, 1895. Serial No. 537,276. (No model.)

*To all whom it may concern:*

Be it known that we, WILLIAM L. VAN HORN and MORTON YOUNT, citizens of the United States, residing at Norfolk, in the county of Madison and State of Nebraska, have invented a new and useful Dish and Pan Washer, of which the following is a specification.

The invention relates to improvements in dish-washers.

The object of the present invention is to provide a simple and inexpensive dish-washer which will be economic in the use of water and which will be capable of enabling dishes to drain effectively to facilitate drying.

The invention consists in the construction and novel combination and arrangement of parts hereinafter fully described, illustrated in the accompanying drawings, and pointed out in the claim hereto appended.

Figure 1:
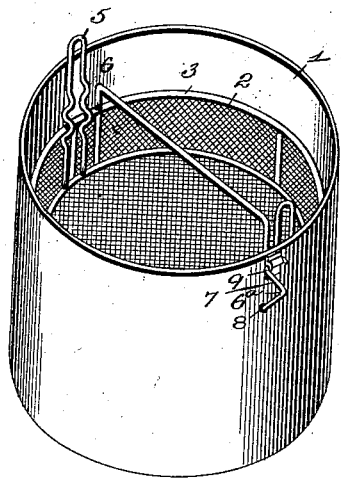
Figure 4:
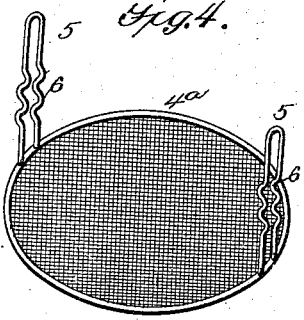
Figure 2:
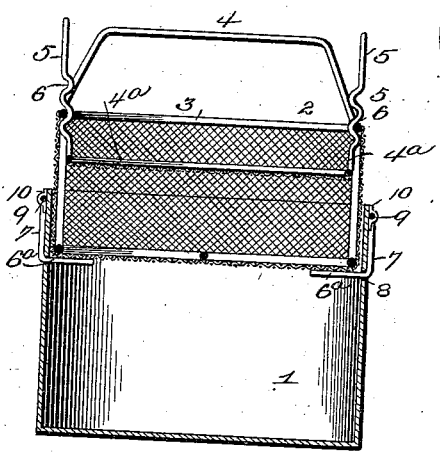
Figure 3:
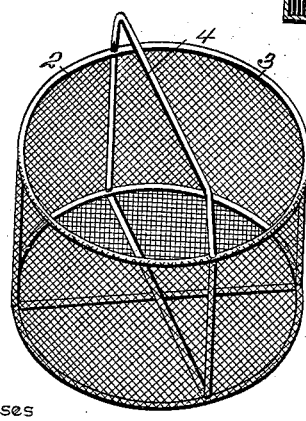

In the drawings, Figure 1 is a perspective view of a dish-washer constructed in accordance with this invention. Fig. 2 is a central vertical sectional view of the same, the dish receptacle or basket being supported for holding its contents to drain. Fig. 3 is a detail perspective view of the dish receptacle or basket. Fig. 4 is a detail perspective view of the adjustable cover.

Like numerals of reference indicate corresponding parts in all the figures of the drawings.

1 designates a cylindrical receptacle constructed of sheet metal and adapted to contain water for cleaning dishes, which are received within a basket or receptacle 2 of cylindrical shape, conforming to the configuration of the vessel 1. The basket 2 is composed of a metal frame covered with wire-netting or similar material to permit the water contained within the receptacle 1 to gain access readily to the basket. The frame of the dish-receiving basket is provided at the top with a ring 3, and has a bail 4, and after the dishes are placed within the basket they are securely held against accidental shifting and consequent cracking or breaking by an adjustable cover $4^a$ of a diameter to fit within the basket and adapted to be raised or lowered to accommodate itself to the contents of the basket. The cover is disk-shaped, and is provided with a pair of upwardly-extending inverted U-shaped loops 5, provided with a series of twists or bends 6, forming recesses and adapted to engage the ring 3 of the basket, whereby the cover is locked in its vertical adjustment.

The contents of the basket may be washed by two motions of the basket within the body or vessel 1. The basket may be raised and then plunged into the water, or it may be rotated on the bottom of the body or vessel 1 and suddenly reversely rotated. This churning of the water agitates it sufficiently to drive it through the contents of the basket, and the dishes will be rapidly washed.

The sides of the body or vessel 1 extend above the basket to avoid splashing the water contained within the body or vessel over the operator.

After the dishes have been washed the basket is supported above the water by means of pivoted catches $6^a$, mounted on the sides of the body or vessel 1, and consisting of a shank journaled or hinged at its upper end and provided at its lower end with a supporting-arm 7, adapted to project through a perforation 8 of the body or receptacle 1 and to project into the same and to extend beneath the basket and form a support for the same. The shank is provided at its upper end with an integral pintle 9, arranged in an eye 10 of the body or receptacle 1, and having its outer terminal angularly bent to secure it in the eye. By this construction the dishes may be dried after washing without the hands of the operator coming in contact with them during the washing and drying process. To thoroughly drain the dishes, the basket or receptacle should be turned edgewise or over on its side, so as to arrange the dishes in a vertical position, and the catches will support the basket or receptacle in this position and all the water contained in the dishes will run from them, leaving the contents of the basket or receptacle in a dry condition.

It will be seen that the dish-washer is simple and inexpensive in construction, that it is efficient in operation, and that dishes, pans, and similar vessels may be washed and dried without the hands of the operator coming in contact with the water. It will also be apparent that the dish-washer is economic in the use of water in arranging the plates, saucers, and similar dishes horizontally instead of vertically, and few dishes may be washed in this manner with as little water as many, whereas when the dishes are arranged vertically it requires much water to cover them, and when only a few dishes are washed at a time they will displace but a small amount of water and a large quantity will be required to fill the vessel to the extent of covering them.

Changes in the form, proportion, and the minor details of construction may be resorted to without departing from the principle or sacrificing any of the advantages of this invention.

What we claim is—

A dish washer, comprising an outer receptacle, a foraminous dish receiving basket having a bail, and an adjustable cover arranged within the basket, and provided with upwardly extending inverted U shaped loops provided at their sides with a series of bends or twists forming recesses arranged to engage the upper edge of the basket, whereby the cover is locked in the desired adjustment, substantially as described.

In testimony that we claim the foregoing as our own we have hereto affixed our signatures in the presence of two witnesses.

WILLIAM L. VAN HORN.
MORTON YOUNT.

Witnesses:
C. J. HORISKEY,
E. E. HARTER.